United States Patent
Persson et al.

(10) Patent No.: US 9,222,380 B2
(45) Date of Patent: Dec. 29, 2015

(54) POWERTRAIN AND METHOD FOR FAST START OF AN INTERNAL COMBUSTION ENGINE IN A HYBRID ELECTRIC VEHICLE

(71) Applicant: VOLVO CAR CORPORATION, Gothenburg (SE)

(72) Inventors: Dan Persson, Landvetter (SE); Roger Boden, Kungsbacka (SE); Tomas Ivarsson, Veddige (SE); Per Holmqvist, Torslanda (SE); Lars Berggren, Oejersjoe (SE); Ingvar Akesson, Gothenburg (SE); Per Kylstad, Floda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/675,374

(22) Filed: Nov. 13, 2012

(65) Prior Publication Data

US 2013/0124022 A1 May 16, 2013

(30) Foreign Application Priority Data

Nov. 16, 2011 (EP) .................................... 11189384

(51) Int. Cl.
*F01M 1/16* (2006.01)
*F01M 1/02* (2006.01)
*F02N 19/00* (2010.01)
(Continued)

(52) U.S. Cl.
CPC ................. *F01M 1/16* (2013.01); *B60W 10/30* (2013.01); *B60W 30/18054* (2013.01); *F01M 1/02* (2013.01); *F02N 19/001* (2013.01); *F16H 57/0439* (2013.01); *B60K 2025/005* (2013.01); *F01M 2001/0215* (2013.01); *F02D 29/04* (2013.01); *F02N 2200/025* (2013.01); *Y10S 903/903* (2013.01)

(58) Field of Classification Search
CPC ........................................................ F01M 1/16
USPC ................... 701/22, 101, 112, 113; 180/65.1, 180/65.21–65.8; 184/6.4, 27.1–27.4; 123/179.1, 196 S
See application file for complete search history.

(56) References Cited

U.S. PATENT DOCUMENTS 4,502,431 A     3/1985   Lulich
5,655,990 A * 8/1997   Ooyama et al. ................. 477/15
(Continued)

FOREIGN PATENT DOCUMENTS

DE    102007024754    11/2008
DE    102008042057    3/2010
EP     0962631     8/1999

OTHER PUBLICATIONS

Extended European Search Report for EP11189384.8 dated Apr. 25, 2012.

*Primary Examiner* — Thomas Tarcza
*Assistant Examiner* — Tyler J Lee
(74) *Attorney, Agent, or Firm* — Brooks Kushman P.C.

(57) ABSTRACT

A plug-in hybrid electric vehicle powertrain includes an internal combustion engine and an electric vehicle traction motor, an engine lubrication oil pump in fluid communication with a lubrication oil flow circuit for the internal combustion engine, an electric oil pump drive motor drivingly connected to the lubrication oil pump, and a powertrain control module. The powertrain control module is configured to start the electric oil pump drive motor immediately upon the initial start of the vehicle.

15 Claims, 1 Drawing Sheet

(51) Int. Cl.
    *F16H 57/04*           (2010.01)
    *B60W 10/30*          (2006.01)
    *B60W 30/18*          (2012.01)
    *F02D 29/04*          (2006.01)
    *B60K 25/00*          (2006.01)

(56) References Cited

U.S. PATENT DOCUMENTS

| | | | |
|---|---|---|---|
| 6,029,621 A | 2/2000 | Berels | |
| 7,357,213 B2* | 4/2008 | Ji | 180/305 |
| 7,395,803 B2* | 7/2008 | Ledger et al. | 123/196 R |
| 7,546,821 B2* | 6/2009 | Russell et al. | 123/90.12 |
| 7,748,353 B2* | 7/2010 | Russell et al. | 123/90.12 |
| 7,867,133 B2* | 1/2011 | Petridis et al. | 477/3 |
| 8,018,190 B2* | 9/2011 | Claeys et al. | 318/432 |
| 8,346,421 B2* | 1/2013 | Bryan et al. | 701/22 |
| 8,795,118 B2* | 8/2014 | Hideg et al. | 475/8 |
| 2002/0084118 A1* | 7/2002 | Esaki | 180/65.2 |
| 2007/0080582 A1* | 4/2007 | Tanaka et al. | 303/115.4 |
| 2007/0204816 A1* | 9/2007 | Russell et al. | 123/90.12 |
| 2007/0204817 A1* | 9/2007 | Russell et al. | 123/90.12 |
| 2009/0021203 A1* | 1/2009 | Claeys et al. | 318/452 |
| 2009/0118878 A1* | 5/2009 | Park | 701/22 |
| 2010/0288570 A1 | 11/2010 | Tarnowsky et al. | |
| 2011/0297258 A1* | 12/2011 | Tanaka et al. | 137/565.11 |
| 2012/0091933 A1* | 4/2012 | Inamura et al. | 318/400.3 |
| 2012/0191322 A1* | 7/2012 | Garrard | 701/103 |
| 2012/0275930 A1* | 11/2012 | Hideg et al. | 417/53 |
| 2012/0277060 A1* | 11/2012 | Kubo et al. | 477/5 |

* cited by examiner

# POWERTRAIN AND METHOD FOR FAST START OF AN INTERNAL COMBUSTION ENGINE IN A HYBRID ELECTRIC VEHICLE

CROSS-REFERENCE TO RELATED APPLICATIONS

This application claims foreign priority benefits under 35 U.S.C. §119(a)-(d) to European patent application number EP 11189384.8, filed Nov. 16, 2011, which is incorporated by reference in its entirety.

TECHNICAL FIELD

The present disclosure relates to a plug-in hybrid electric vehicle powertrain comprising an internal combustion engine and an electric vehicle traction motor, an engine lubrication oil pump in fluid communication with a lubrication oil flow circuit for the internal combustion engine, an electric oil pump drive motor drivingly connected to the lubrication oil pump, and a powertrain control module. It further relates to a method for establishing lubrication oil pressure for an internal combustion engine in a plug-in hybrid electric vehicle powertrain comprising an internal combustion engine and an electric vehicle fraction motor, an engine lubrication oil pump in fluid communication with a lubrication oil flow circuit for the internal combustion engine, an electric oil pump drive motor drivingly connected to the lubrication oil pump, and a powertrain control module.

BACKGROUND

A lubrication oil pressure at a certain level is necessary when an internal combustion engine is running. Without sufficient lubrication wear for instance of bearings or even seizure of the engine will be the result. When starting a vehicle equipped with an internal combustion engine as the only power source a lubrication oil pressure is built up within a couple of seconds, i.e. there is a sufficient oil pressure prior to when the driver normally requires power output from the engine.

For a plug-in hybrid electric vehicle the electric vehicle traction motor will drive the vehicle as long as power is available from the battery and the request for power is moderate. However, at some point, either when the power runs low on the battery or if the driver requests more power than what the electric vehicle traction motor can produce, the internal combustion engine will have to start. Especially, if the driver wants to accelerate the vehicle at an already relatively high rpm on the powertrain, the delay in the response will be significant if the internal combustion engine is to first have a sufficient lubrication oil pressure. Thus, the problem is to as fast as possible get power from when starting the internal combustion engine without damaging it.

SUMMARY

The object of the embodiments disclosed herein is to provide a plug-in hybrid electric vehicle powertrain and a method for establishing lubrication oil pressure quickly upon starting the internal combustion engine of a plug-in electric hybrid vehicle.

These objects are achieved by the powertrain and method as set forth in the appended claims.

According to one aspect of the disclosed embodiments a plug-in hybrid electric vehicle powertrain comprises an internal combustion engine and an electric vehicle traction motor, an engine lubrication oil pump in fluid communication with a lubrication oil flow circuit for the internal combustion engine, an electric oil pump drive motor drivingly connected to the lubrication oil pump, and a powertrain control module. The powertrain control module is configured to start the electric oil pump drive motor immediately upon the initial start of the vehicle.

Thus, when the vehicle is initially started, battery power is used to run the electric oil pump drive motor and hence the engine lubrication oil pump. By running the oil pump immediately upon starting of the vehicle, the time required for achieving sufficient oil pressure in order to be able to get power from the internal combustion engine is considerably reduced. The idea is further that there should be no ignition of the internal combustion engine when performing this priming.

Some tests have shown that without this "priming" the time to reach an acceptable oil pressure is about two seconds or more, of course depending on ambient conditions such as for instance temperature. With the suggested priming or initial run of the oil pump, the time for reaching sufficient oil pressure can be reduced to less than one second. The time for reaching sufficient oil pressure can be reduced to less than one second even though the time between the initial start of the vehicle and the starting of the internal combustion engine might be as long as one hour. The development is going towards better batteries, i.e. better capacity allowing for longer periods of electric vehicle mode. The shorter the time is in between the starting of the vehicle and the starting of the internal combustion engine the faster the pressure can reach a sufficient level since the pressure does not decrease instantaneously following the priming.

According to a further aspect of the disclosed embodiments the lubrication oil flow circuit comprises a lubrication oil flow reservoir wherein the lubrication oil pump has an oil flow inlet connected to the lubrication oil flow reservoir.

The powertrain may comprise a high voltage traction battery electrically coupled to the electric oil pump drive motor through an electric relay circuit.

Also an electric oil pump drive motor may be provided that is a reversible generator connected to the oil pump via a crank shaft. With this solution no additional devices are necessary.

Further, according to another aspect the electric oil pump drive motor is an integrated starter generator (ISG).

BRIEF DESCRIPTION OF THE DRAWINGS

The powertrain according to one embodiment is explained below in more detail with reference to the FIG. 1 showing a simplified layout of the plug-in hybrid electric vehicle powertrain. A method according to one embodiment is explained below in more detail with reference to FIG. 2 showing a simplified flowchart of a method for establishing lubrication oil pressure for an internal combustion engine in a plug-in hybrid electric vehicle powertrain.

DETAILED DESCRIPTION

As required, detailed embodiments are disclosed herein; however, it is to be understood that the disclosed embodiments are merely exemplary and may take various and alternative forms. The figure are not necessarily to scale; some features may be exaggerated or minimized to show details of particular components. Therefore, specific structural and functional details disclosed herein are not to be interpreted as limiting, but merely as a representative basis for teaching one skilled in the art.

The embodiments disclosed will now be explained with reference made to the enclosed figure. The example is chosen in order to facilitate the reading and understanding of the invention.

Figure 1:
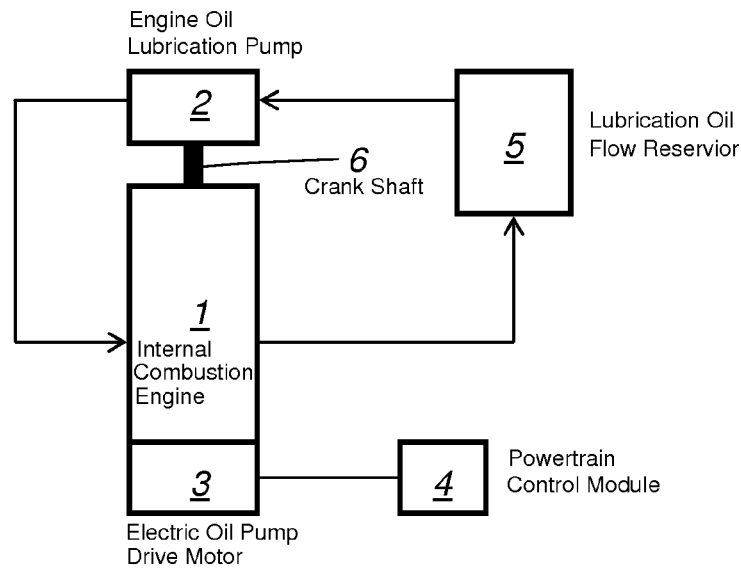

FIG. 1 shows an internal combustion engine 1 of an plug-in hybrid electric vehicle, an engine lubrication oil pump 2 in fluid communication with a lubrication oil flow circuit for the internal combustion engine, an electric oil pump drive motor 3 drivingly connected to the lubrication oil pump 2, and a powertrain control module 4. The lubrication oil flow circuit further comprises a lubrication oil flow reservoir 5, the lubrication oil pump 2 having an oil flow inlet connected to the lubrication oil flow reservoir 5.

When the plug-in hybrid electric vehicle is powered on, the electric oil pump drive motor 3 is started powered by a battery. Thus, since the electric oil pump drive motor 3 is drivingly connected to the lubrication oil pump 2 the oil pressure in the engine 1 increases. When the pressure reaches a predetermine value the control module 4 switches the electric oil pump drive motor 3 off.

Figure 2:
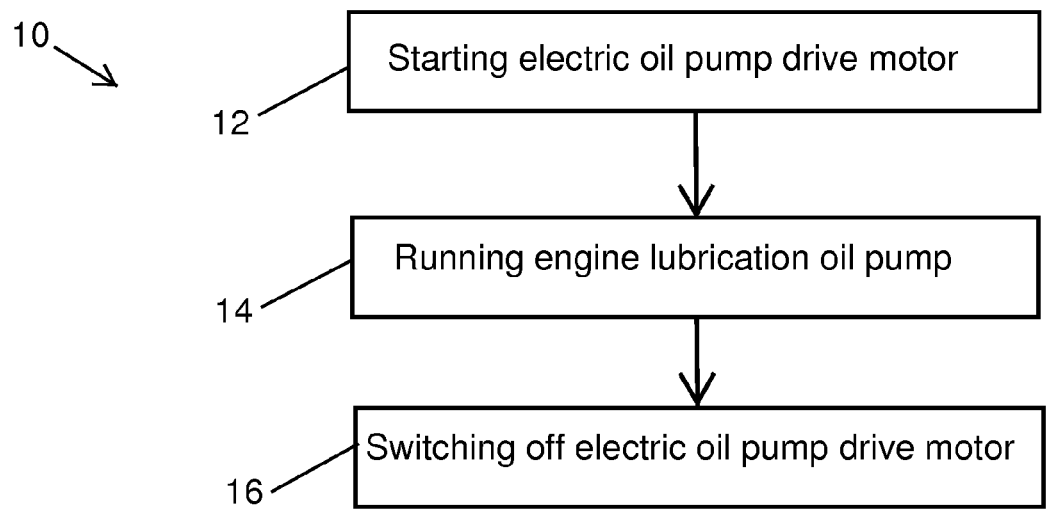

The electric oil pump drive motor 3 is a reversible generator connected to the oil pump via a crank shaft 6. In the shown embodiment the electric oil pump drive motor 3 is an integrated starter generator (ISG). FIG. 2 shows a method 10 for establishing lubrication oil pressure for an internal combustion engine in a plug-in hybrid electric vehicle powertrain comprising an internal combustion engine and an electric vehicle traction motor, an engine lubrication oil pump in fluid communication with a lubrication oil flow circuit for the internal combustion engine, an electric oil pump drive motor drivingly connected to the lubrication oil pump, and a powertrain control module. As seen therein, the method comprises starting 12 the electric oil pump drive motor upon initial start of the plug-in hybrid electric vehicle, running 14 the engine lubrication oil pump until the lubrication oil pressure reaches a predetermine value, and switching off 16 the electric oil pump drive motor.

The foregoing is a disclosure of an exemplary powertrain and method. However, it is apparent that powertrains and methods incorporating modifications and variations will be obvious to one skilled in the art. Inasmuch as the foregoing disclosure is intended to enable one skilled in the art to practice the embodiments disclosed, it should not be construed to be limited thereby, but should be construed to include such modifications and variations as fall within the scope of the claims. For instance, the lubrication oil reservoir is more likely to be immediately attached to the engine than what is shown in FIG. 1.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A plug-in hybrid electric vehicle powertrain comprising:
   an internal combustion engine and an electric vehicle traction motor;
   an engine lubrication oil pump in fluid communication with a lubrication oil flow circuit for the internal combustion engine;
   an electric oil pump drive motor drivingly connected to the lubrication oil pump; and
   a powertrain control module configured to start the electric oil pump drive motor immediately upon initial start of the vehicle;
   wherein the electric oil pump drive motor is a reversible generator directly mechanically connected to the oil pump via a crank shaft without the use of a clutch.

2. The plug-in hybrid electric vehicle powertrain according to claim 1, wherein the lubrication oil flow circuit comprises a lubrication oil flow reservoir, the lubrication oil pump having an oil flow inlet connected to the lubrication oil flow reservoir.

3. The plug-in hybrid electric vehicle powertrain according to claim 1, further comprising a high voltage traction battery electrically coupled to the electric oil pump drive motor through an electric relay circuit.

4. The plug-in hybrid electric vehicle powertrain according to claim 1, wherein the electric oil pump drive motor is an integrated starter generator (ISG).

5. A method for establishing lubrication oil pressure for an internal combustion engine in a plug-in hybrid electric vehicle powertrain comprising an internal combustion engine and an electric vehicle traction motor, an engine lubrication oil pump in fluid communication with a lubrication oil flow circuit for the internal combustion engine, an electric oil pump drive motor drivingly connected to the lubrication oil pump, and a powertrain control module, the method comprising:
   starting the electric oil pump drive motor immediately upon initial start of the plug-in hybrid electric vehicle;
   running the engine lubrication oil pump until a lubrication oil pressure reaches a predetermine value; and
   switching off the electric oil pump drive motor;
   wherein the electric oil pump drive motor is a reversible generator directly mechanically connected to the oil pump via a crank shaft without the use of a clutch.

6. The plug-in hybrid electric vehicle powertrain according to claim 2, further comprising a high voltage traction battery electrically coupled to the electric oil pump drive motor through an electric relay circuit.

7. The plug-in hybrid electric vehicle powertrain according to claim 2, wherein the electric oil pump drive motor is an integrated starter generator (ISG).

8. The plug-in hybrid electric vehicle powertrain according to claim 5, wherein the electric oil pump drive motor is an integrated starter generator (ISG).

9. For use in a plug-in hybrid electric vehicle powertrain having an internal combustion engine and an electric vehicle traction motor, an engine lubrication oil pump in fluid communication with a lubrication oil flow circuit for the internal combustion engine, and an electric oil pump drive motor drivingly connected to the lubrication oil pump, a control system comprising:
   a powertrain control module configured to start the electric oil pump drive motor immediately upon initial start of the vehicle;
   wherein the electric oil pump drive motor is a reversible generator directly mechanically connected to the oil pump via a crank shaft without the use of a clutch.

10. The control system of claim 9 wherein the lubrication oil flow circuit comprises a lubrication oil flow reservoir, the lubrication oil pump having an oil flow inlet connected to the lubrication oil flow reservoir.

11. The control system of claim 9 wherein the electric oil pump drive motor is electrically coupled to a high voltage traction battery through an electric relay circuit.

12. The control system of claim 9 wherein the electric oil pump drive motor is an integrated starter generator (ISG).

13. The method of claim 5 further comprising, after switching off the electric oil pump drive motor:
   starting the electric oil pump drive motor when the lubrication oil pressure decreases below the predetermined value; and
   running the engine lubrication oil pump until the lubrication oil pressure reaches the predetermine value.

14. The plug-in hybrid electric vehicle powertrain of claim 1 wherein the powertrain control module is further configured to switch the electric oil pump drive motor off when a lubrication oil pressure reaches the predetermined lubrication oil pressure and to thereafter start the electric oil pump drive motor when the lubrication oil pressure decreases below the predetermined lubrication oil pressure.

15. The control system of claim 9 wherein the powertrain control module is further configured to switch the electric oil pump drive motor off when a lubrication oil pressure reaches the predetermined lubrication oil pressure and to thereafter start the electric oil pump drive motor when the lubrication oil pressure decreases below the predetermined lubrication oil pressure.

* * * * *

UNITED STATES PATENT AND TRADEMARK OFFICE
CERTIFICATE OF CORRECTION

PATENT NO. : 9,222,380 B2  
APPLICATION NO. : 13/675374  
DATED : December 29, 2015  
INVENTOR(S) : Dan Persson et al.

Page 1 of 1

It is certified that error appears in the above-identified patent and that said Letters Patent is hereby corrected as shown below:

IN THE CLAIMS

Column 4, Line 44, Claim 8:

After "according to"  
Delete "claim 5" and  
Insert -- claim 3 --.

Signed and Sealed this  
Twelfth Day of April, 2016

Michelle K. Lee  
*Director of the United States Patent and Trademark Office*